Dec. 6, 1938.  J. E. NEWTON  2,139,559
RECEPTACLE FOR PIPES
Filed April 27, 1937

Inventor
James E. Newton
by Wright, Brown, Quinby & May
Attys.

Patented Dec. 6, 1938

2,139,559

UNITED STATES PATENT OFFICE 2,139,559

RECEPTACLE FOR PIPES

James Edward Newton, Little Compton, R. I.

Application April 27, 1937, Serial No. 139,238

4 Claims. (Cl. 131—51)

This invention relates to a receptacle for smokers' pipes.

Many pipe smokers own a considerable number of pipes which are apt to be scattered around unless some convenient receptacle is provided for them.

It is an object of the present invention to provide a compact and convenient receptacle for pipes, such receptacle being provided with a rack which is readily removable from the receptacle for cleaning purposes. According to the present invention, provision is also made for supporting a number of pipe cleaners.

Advantageous features of structure will be apparent from the following description of an embodiment of the invention, and from the drawing of which Figure 1 is a sectional view of a receptacle embodying the invention.

Figure 1:
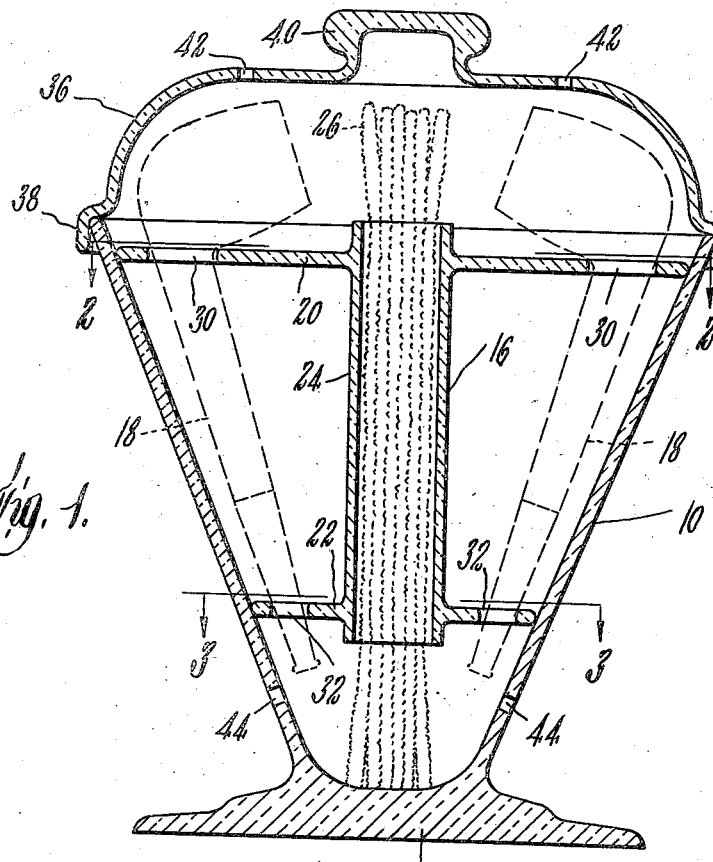
Figure 2:
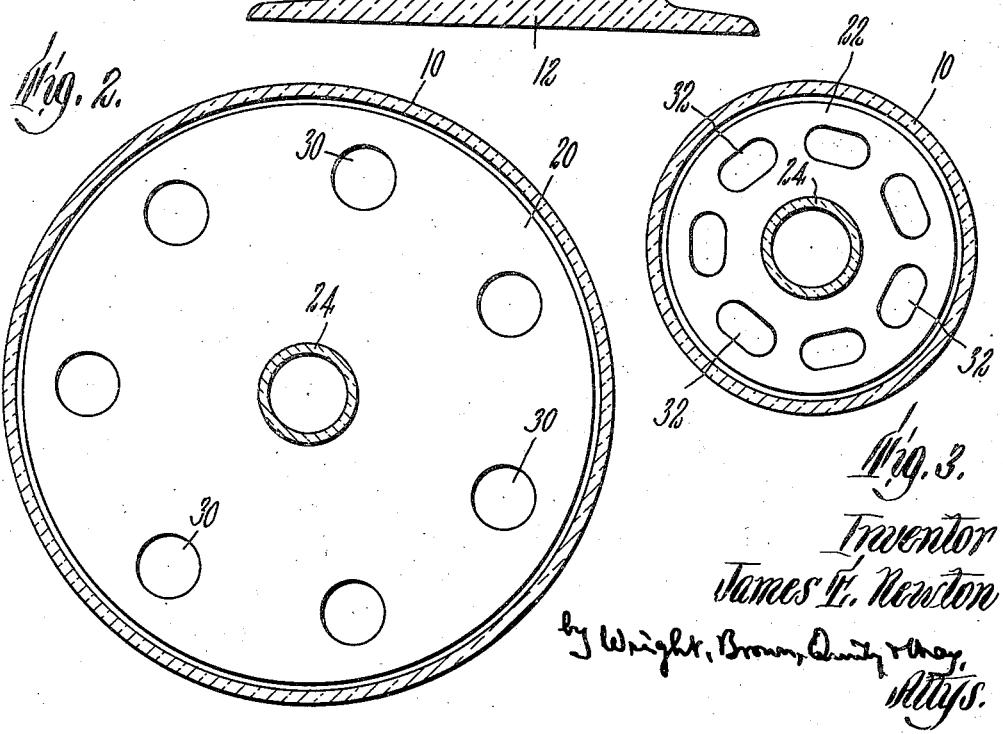
Figure 2 is a section on the line 2—2 of Figure 1.
Figure 3:
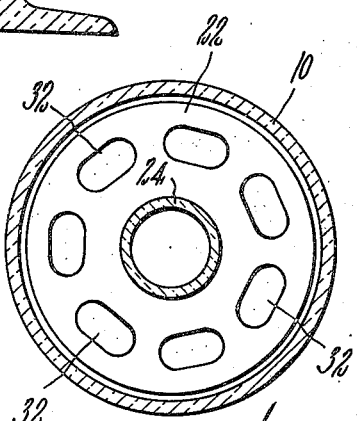
Figure 3 is a section on the line 3—3 of Figure 1.

As indicated in Figure 1, the receptacle 10 is comparatively narrow at its bottom and wide at its top, and may be approximately in the shape of an inverted cone, the sides of the receptacle flaring upwardly from a base 12 which is shown integral therewith and is of sufficient diameter to provide a stable support for the receptacle. Any suitable material may be employed, such as plain or fancy glass, plastic material, wood, metal or any equivalent thereof. Within the receptacle is a suitable rack 16 for supporting a number of pipes 18. This rack is preferably removable as a unit from the receptacle. While it is illustrated as being made integrally in a single piece, it may be composed of two or more pieces secured together. The rack may be made of glass, as shown, or of any other suitable material or combination of materials as desired. As shown, the rack comprises an upper disk 20 and a lower disk 22 vertically spaced from each other. A connecting and spacing member 24 extends vertically between the two disks, the connecting member 24 being preferably tubular so as to receive a number of pipe cleaners 26. The tubular member 24 is shown as being open at its upper and lower ends. However, if preferred, the lower end may be closed so as to support the cleaners 26 above the bottom of the receptacle 10. The rack 16 is preferably supported within the receptacle by the engagement of the rims of the disks 20 and 22 with the walls of the receptacle, the diameters of the disks being so related to the distance between them as to permit simultaneous engagement of their rims with the walls of the receptacle. As shown, the upper disk 20 is of such a diameter as to support the disk near the rim of the receptacle 10. Thus the bowls of the pipes 18 carried by the rack 16 project substantially above the rim of the receptacle and are thus easily grasped for removal of the pipes from the rack. In order to support the pipes 18 in an orderly array and in properly inclined positions, the upper disk 20 is provided with a circular series of apertures 30 of suitable size to receive the stem portions of the pipes adjacent to the bowls, these apertures being sufficiently spaced from the central member 24 to allow room for the bowls of the pipes when arranged as indicated in Figure 1. Corresponding apertures 32 are provided in the lower disk 22 to receive the mouth pieces of the pipes. Thus the pipes are supported in a compact array, each pipe having its stem inclined so as to drain by gravity and to be freely ventilated. To protect the pipes and cleaners from dust, a domed cover 36 may be provided, this cover having a rim 38 fitting over the rim of the receptacle, and a central knob or handle 40 by which the cover may be readily removed. For ventilating the receptacle, the cover may be supplied with suitable vents 42, the receptacle itself being preferably supplied with a series of vents 44 near the base thereof. The fit of the pipe stems and mouth pieces in the apertures 30 and 32 is sufficiently loose to permit circulation of air through these apertures even when the receptacle is filled with pipes, but, if desired, the disks 20 and 22 may be provided with ventilating apertures (not shown) in addition to the apertures 30 and 32.

It is obvious that various modifications and changes may be made in the details of structure of the embodiment of the invention herein shown and described without departing from the spirit or scope thereof as defined in the following claims.

I claim:—

1. A receptacle for smokers' pipes, comprising a vessel having the approximate shape of an inverted cone with a base, a pair of spaced horizontal disks engaging within said vessel, said disks having holes to receive pipe stems, a connecting element extending vertically between said disks, and a cover upon said vessel.

2. A receptacle for smokers' pipes, comprising a vessel and cover of transparent material, said vessel having the approximate shape of an inverted cone with a base, a rack within said vessel consisting of a pair of spaced horizontal disks of different diameters to engage within said vessel, and a vertical tubular element with an unobstructed bore secured to said disks adapted to receive and support a number of pipe cleaners, said disks having holes therein to receive pipe stems, and a cover on said vessel.

3. A receptacle for smokers' pipes, comprising a vessel having a base, a narrow lower portion, and upwardly flaring sides, a rack within said vessel consisting of an upper horizontal plate engaging within said vessel near the rim thereof, a lower horizontal plate spaced from the upper plate, and a central tubular element connecting said plates so that said rack can be removed as a unit, said plates having series of corresponding holes to receive pipe stems, and a domed cover resting on said rim and forming with said upper plate a chamber for the bowls of the pipes within the receptacle.

4. A receptacle for smokers' pipes, comprising a conical vessel with upwardly flaring walls, a circular disk fitted within and supported by the wall of said vessel near the rim thereof, said disk having a central aperture to receive pipe cleaners and a circular series of apertures to receive pipe stems, and a domed cover fitted on the rim of said vessel and having sufficient clearance above said disk for the bowls of pipes inserted into said apertures.

JAMES EDWARD NEWTON.